US008045751B2

(12) United States Patent
Nagamine

(10) Patent No.: US 8,045,751 B2
(45) Date of Patent: Oct. 25, 2011

(54) INFORMATION OUTPUTTING DEVICE, INFORMATION OUTPUTTING METHOD, COMPUTER READABLE RECORDING MEDIUM, AND IMAGE PROJECTING SYSTEM

(75) Inventor: Takeshi Nagamine, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1057 days.

(21) Appl. No.: 11/865,764

(22) Filed: Oct. 2, 2007

(65) Prior Publication Data

US 2008/0240609 A1    Oct. 2, 2008

(30) Foreign Application Priority Data

Mar. 30, 2007    (JP) ................. 2007-093847

(51) Int. Cl.
*G06K 9/00* (2006.01)
*H04N 7/16* (2011.01)
(52) U.S. Cl. .................. 382/100; 382/282; 725/145
(58) Field of Classification Search .................. 382/100, 382/103, 106, 107, 155, 168, 181, 189–195, 382/274, 276, 286–291, 305, 312, 282; 348/10.99, 222.1; 375/240.13; 351/210; 725/137, 133, 145

See application file for complete search history.

(56) References Cited

U.S. PATENT DOCUMENTS

| 5,912,721 | A  | * | 6/1999  | Yamaguchi et al. | 351/210 |
| 6,999,117 | B2 | * | 2/2006  | Yamazaki | 348/222.1 |
| 7,715,478 | B2 | * | 5/2010  | Abe et al. | 375/240.13 |
| 7,812,860 | B2 | * | 10/2010 | King et al. | 348/210.99 |
| 7,849,493 | B1 | * | 12/2010 | Harvey et al. | 725/137 |

FOREIGN PATENT DOCUMENTS

| JP | 2006-293455 |   | * 10/2006 |
| JP | 2006-293455 | A | 10/2006 |

* cited by examiner

*Primary Examiner* — Seyed Azarian
(74) *Attorney, Agent, or Firm* — Sughrue Mion, PLLC

(57) ABSTRACT

Provided is a device that records or outputs information, which acquires a first image to be a display target, judges whether at least a part of the acquired first image is a preset non-target image, and determines whether the acquired first image is an image to be recorded or output. When it is determined that the acquired first image is the image to be recorded or output as a result of the determination, the device records or outputs the acquired first image.

18 Claims, 11 Drawing Sheets

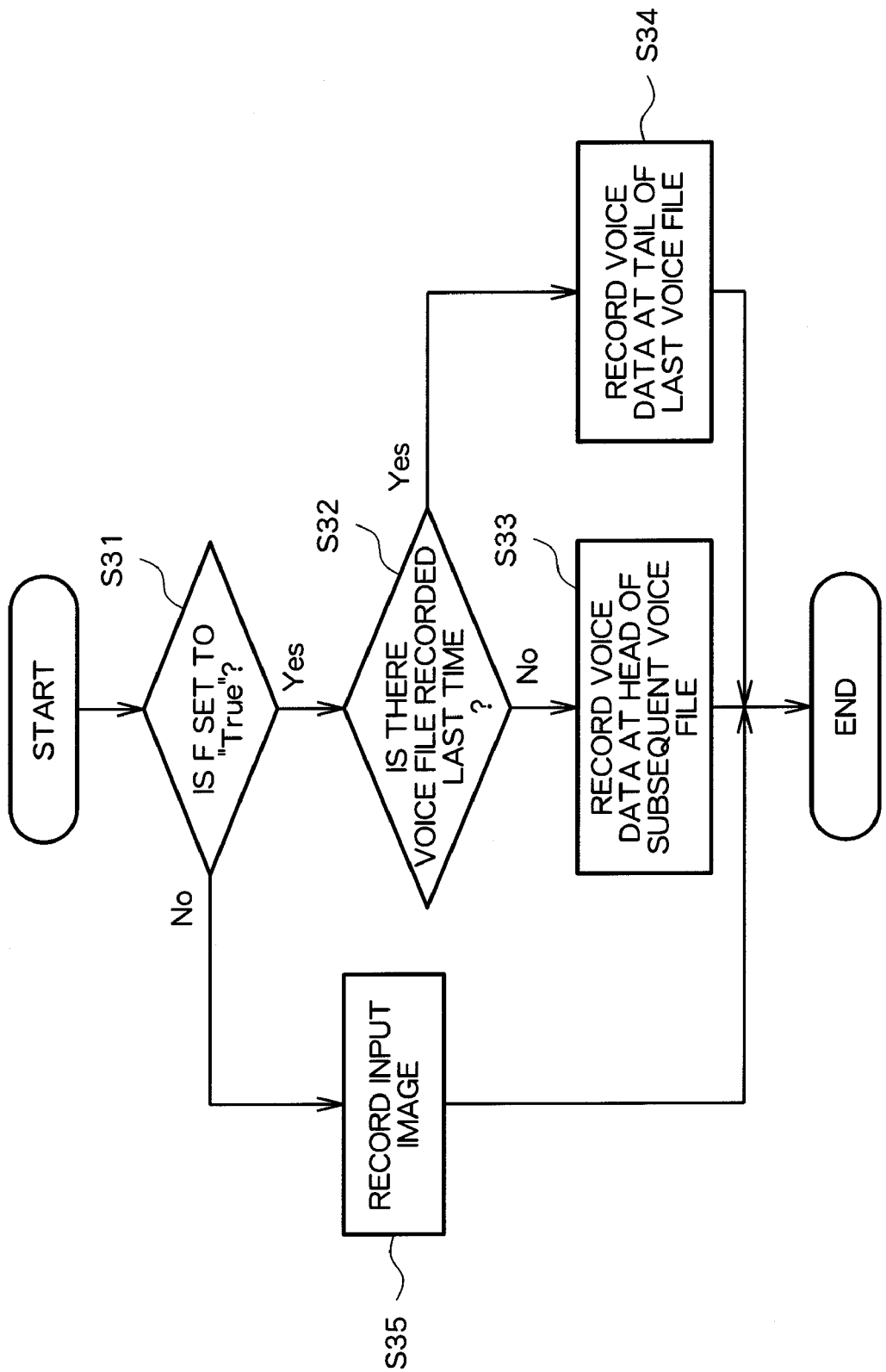

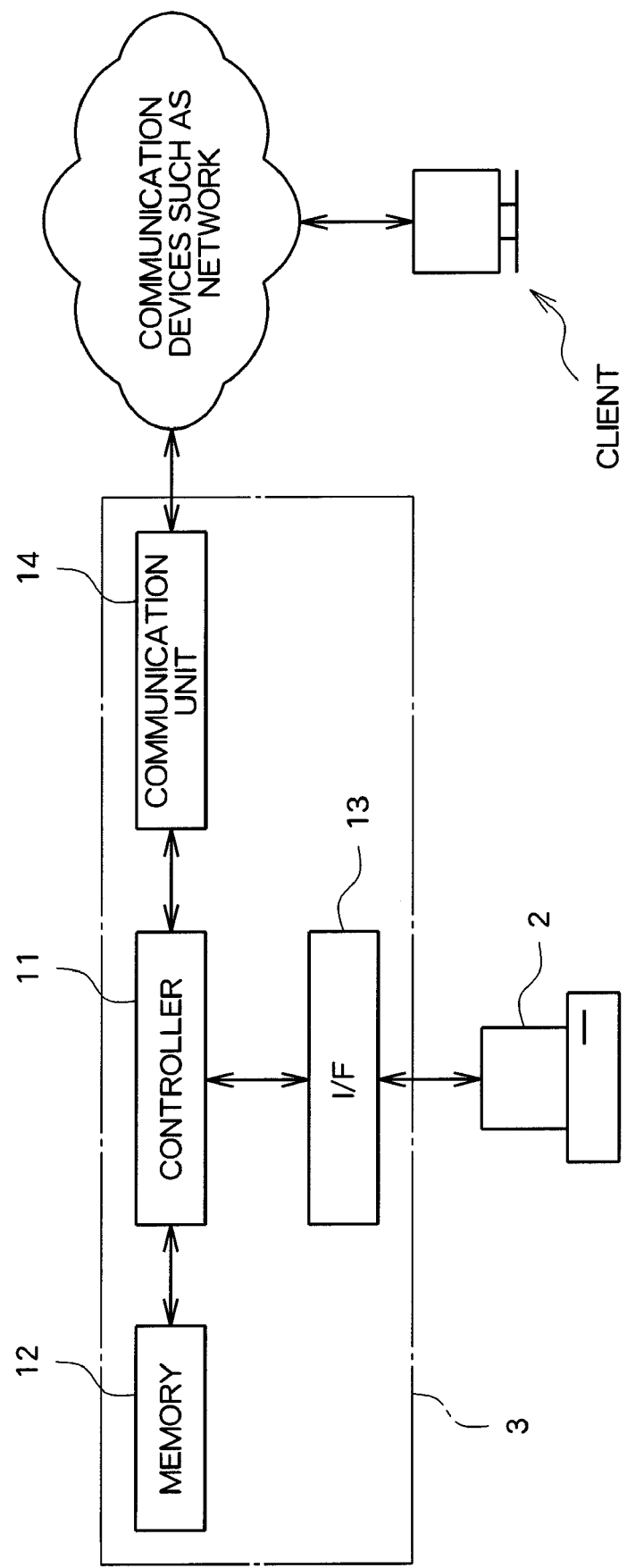

INFORMATION OUTPUTTING DEVICE, INFORMATION OUTPUTTING METHOD, COMPUTER READABLE RECORDING MEDIUM, AND IMAGE PROJECTING SYSTEM

CROSS-REFERENCE TO RELATED APPLICATIONS

This application is based on, and claims priority under 35 USC 119 from Japanese Patent Application No. 2007-093847 filed Mar. 30, 2007.

BACKGROUND

1. Technical Field

The present invention relates to an information outputting device, an information outputting method, a computer readable recording medium, and an image projecting signal.

2. Related Art

In recent years, in corporate activities, information has been actively shared through slide shows by using presentation software.

There are systems in which images and voices can be reproduced after presentations are held.

In such systems, when the images and voices are reproduced afterward, information unrelated to the presentation may be reproduced together.

SUMMARY

According to an aspect of the present invention, there is provided an information outputting device including: a reception unit that receives a first image which is a target of output; a judgment unit that judges whether at least a part of the first image is a preset image or not; and an output unit that outputs the first image when the first image can be output based on a result of the judgment made by the judgment unit.

BRIEF DESCRIPTION OF THE DRAWINGS

An exemplary embodiment of the present invention will be described in detail based on the following figures, wherein:

FIG. 8 is a flowchart showing another example of the processing of recording an image and voice data in the information recording device according to the first aspect of the exemplary embodiment of the present invention;

FIG. 9 is a structural block diagram of an information providing device according to a second aspect of the exemplary embodiment of the present invention;

DETAILED DESCRIPTION

An information recording device according to a first aspect of an exemplary embodiment of the present invention will be described with reference to the drawings. As exemplified in FIG. 1, an information recording device 1 according to the first aspect is composed of a controller 11, a memory 12, and an interface (I/F) 13. In addition, the information recording device 1 is connected to a personal computer 2 and the like.

The controller 11 is a microcomputer, for example, and is operated by executing a program stored therein. The program may be provided while being recorded on a computer readable recording medium such as a CD-ROM or a DVD-ROM. When the program is provided while being recorded on the recording medium as described above, the program read out of the medium is copied to be stored in the microcomputer.

In the information recording device according to the first aspect, the controller 11 acquires an image output from the personal computer 2 to a display, an external projector, and the like. Then, the controller 11 judges whether the acquired image is a preset image, and determines whether the acquired image is an image to be recorded. Based on the determination, the controller 11 selectively records the images determined to be recorded. Note that in the information recording device according to the first aspect, a voice including uttered by a user of the personal computer 2 is captured through a microphone or the like, and the voice (audio data) is recorded together with the image. An operation of the controller 11 will be described later in detail.

Figures 1, 2:
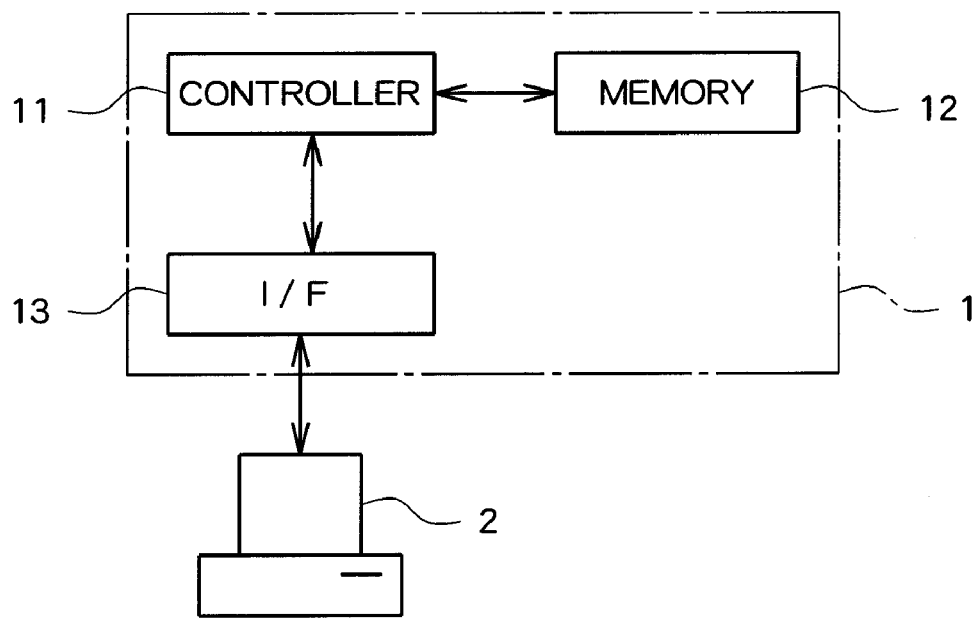
FIG. 1 is a structural block diagram of an information recording device according to a first aspect of an exemplary embodiment of the present invention.
FIG. 2 is an explanatory diagram showing an example of image information and voice information recorded in the information recording device according to the first aspect of the exemplary embodiment of the present invention.

The memory 12 records therein information of images, voices, and the like in accordance with an instruction input from the controller 11. In this exemplary embodiment, as shown in FIG. 2, an image (V) is recorded in association with a date/time (D) at which the image has been acquired, and voice data (A) is also recorded in the memory 12. The voice data is information obtained by encoding voice signals in a predetermined format. For example, the voice data is in a format defined by a motion picture experts group (MPEG) (e.g., MP3). Each image and each item of voice data are associated with information indicating an acquired order thereof. For example, each image and each item of voice data corresponding to a display section of the image are retained as individual files, and names of the files are determined based on a consecutive number indicating the acquired order.

The I/F 13 is, for example, a universal serial bus (USB), which is an interface circuit for connecting the information recording device 1 of the first aspect with the personal computer 2. The information recording device 1 acquires the image output from the personal computer 2 via the I/F 13. Thus, it is assumed that a program for outputting to the information recording device 1 via the USB the image which is to be output to the display, the external projector, or the like for display is executed on the personal computer 2 side.

Note that here, an example in which the information recording device 1 is structured as a separate component from the personal computer 2 is shown. However, the information recording device 1 and the personal computer 2 may be integrated. In this case, a CPU or the like of the personal computer 2 may be operated as the controller 11 of the information recording device 1 according to the first aspect. Further, in this case, a memory of the personal computer 2 may be operated as the memory 12 of the information recording device 1 according to this exemplary embodiment, or by storing information to be a recording target in an external memory such as a memory card, for example, the external memory may be operated as the memory 12 of the information recording device 1 according to this exemplary embodiment. In this case, the controller 11 performs an operation as the controller 11 of the information recording device 1 according to this exemplary embodiment while acquiring an image that is to be output to an external device according to an instruction of a user instead of acquiring the image output to the display, the external projector, or the like from the personal computer 2.

Further, in another example, the I/F 13 is an input/output terminal for video signals and includes a video output terminal of the personal computer 2 and a video input terminal of an external device such as a projector. In this case, the information recording device 1 acquires a display target image from the video signals output from the personal computer 2 side. Then, the information recording device 1 supplies the video signals to the video input terminal of the external device such as the projector as they are.

General presentation software is installed in the personal computer 2 so that images for the slide show can be output. The personal computer 2 is operated based on an operating system such as Windows (registered trademark), and data can be individually displayed in an area called a window.

Figure 3A:
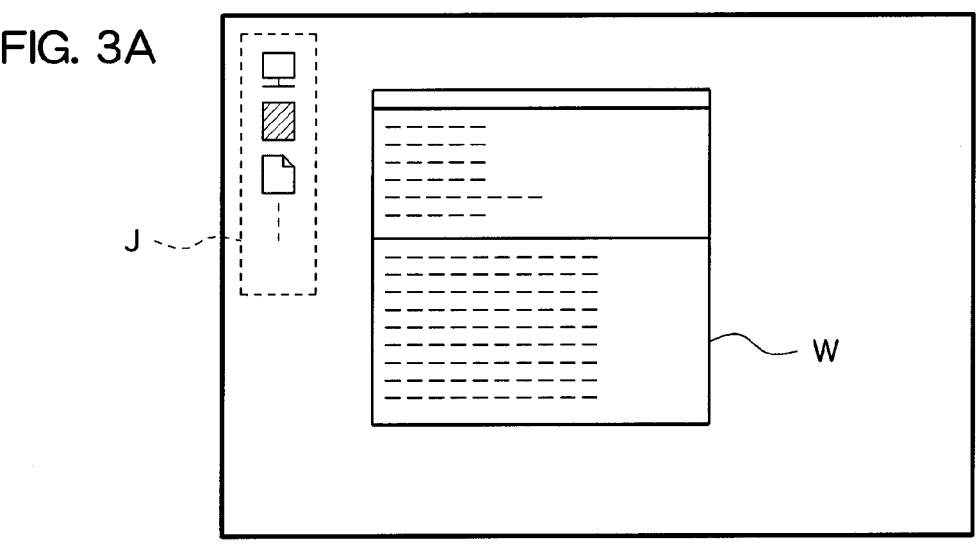
FIG. 3A is an explanatory diagram showing an example of an image input to the information recording device according to the first aspect of the exemplary embodiment of the present invention.
Figure 3B:
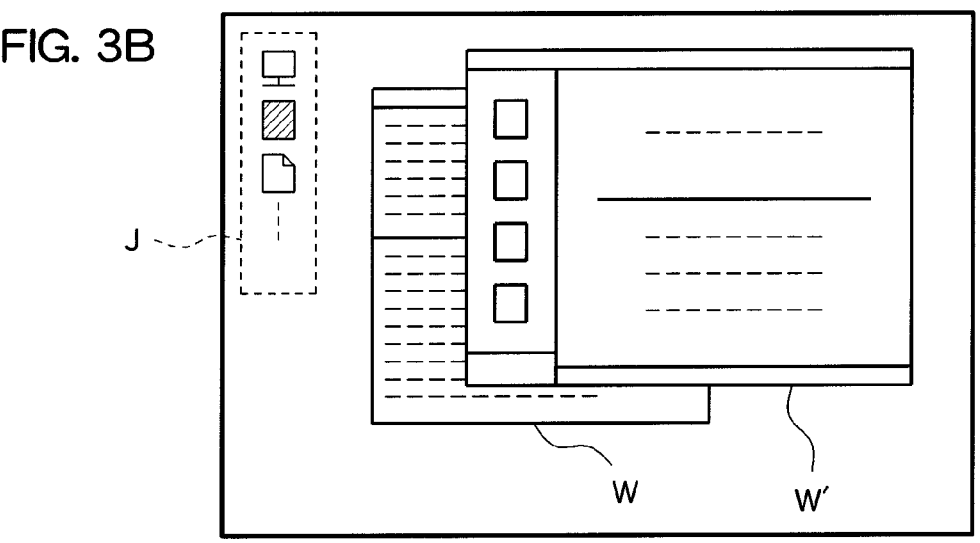
FIG. 3B is an explanatory diagram showing another example of the image input to the information recording device according to the first aspect of the exemplary embodiment of the present invention.

Specifically, in order to activate the presentation software, the user who is to give a presentation first performs an operation for loading information regarding the slide show. During the operation, as shown in FIG. 3A, for example, the personal computer 2 displays a background including various icons (J) and a window W containing data of another application (e.g., reception screen of an email). As shown in FIG. 3B, the personal computer 2 also displays a window W' displaying data that is a content of the presentation together with those described above.

Figure 3C:
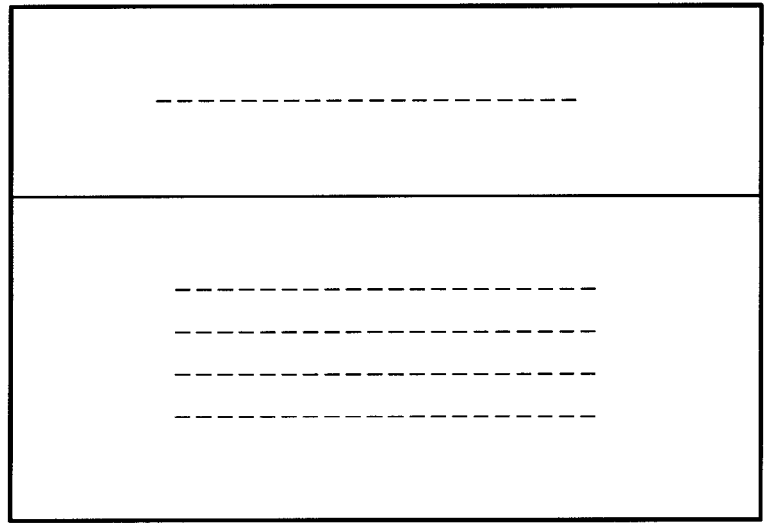
FIG. 3C is an explanatory diagram showing still another example of the image input to the information recording device according to the first aspect of the exemplary embodiment of the present invention.

When an instruction is given to start the presentation, the personal computer 2 displays only the contents of the slide show (full-screen display) as shown in FIG. 3C. However, when ending the slide show, screens as shown in FIGS. 3A and 3B are displayed.

Figure 4:
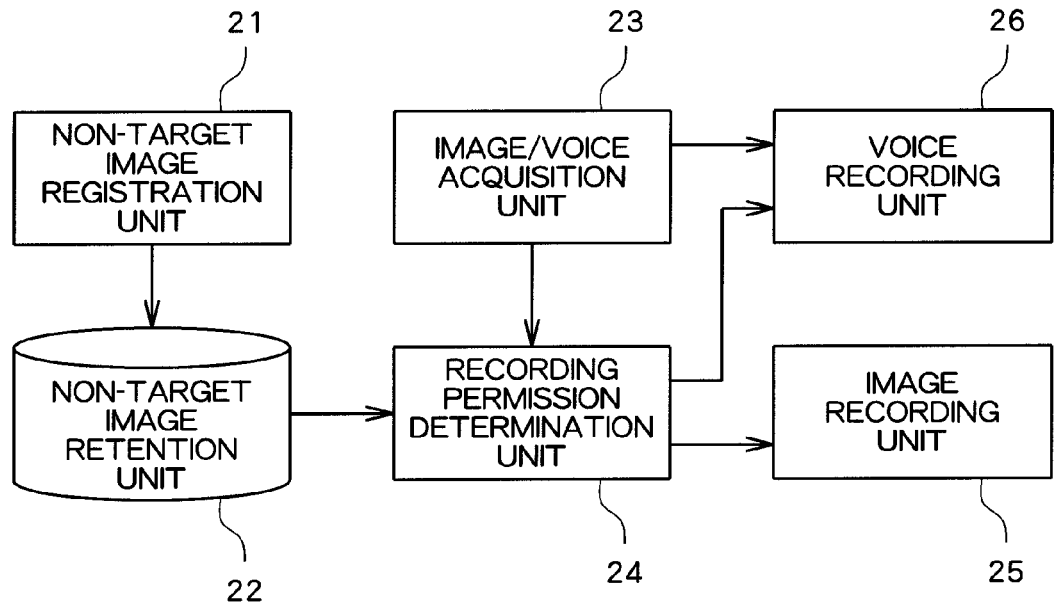
FIG. 4 is a functional block diagram showing an example of the information recording device according to the first aspect of the exemplary embodiment of the present invention.

As shown in FIG. 4, the information recording device 1 according to the first aspect is functionally composed of, due to software processing of the controller 11, a non-target image registration unit 21, a non-target image retention unit 22, an image/voice acquisition unit 23, a recording permission determination unit 24, an image recording unit 25, and a voice recording unit 26.

The non-target image registration unit 21 acquires an image input via the I/F 13 as a non-target image. The non-target image registration unit 21 causes the non-target image retention unit 22 to retain, as the non-target image, the image input together with an instruction to record the image as the non-target image, for example. For instance, the personal computer 2 may output images (images as shown in FIGS. 3A and 3B) and the instruction to record the images as the non-target image until the images are displayed on a full-screen display. Further, in the personal computer 2, an instruction to record, as the non-target image, images within a range selected by the user among the output images may be output.

At this time, the non-target image registration unit 21 causes the non-target image retention unit 22 to store, together with coordinate information indicating the selected range, the acquired image as the non-target image.

Further, in another example, the information recording device 1 according to the first aspect may include a switch (not shown). In this case, the non-target image registration unit 21 causes the non-target image retention unit 22 to retain as the non-target image the image acquired while the switch is being ON.

The non-target image retention unit 22 stores the non-target image in the memory 12. Here, there may be plural non-target image to be stored.

The image/voice acquisition unit 23 receives an image output from the personal computer 2 and voice signal data captured by the microphone or the like. Then, the image/voice acquisition unit 23 outputs the voice signal data to the voice recording unit 26. Further, the image/voice acquisition unit 23 acquires input images at every predetermined time and outputs the acquired images to the recording permission determination unit 24.

The acquisition time used herein is, for example, a time at which an amount of a detected change of the input image (number of pixels whose value has changed or a ratio of the number of pixels to all the pixels in the screen) exceeds a preset threshold.

The image/voice acquisition unit 23 may output a signal indicating that the image has been acquired to the voice recording unit 26 at a time when the image has been acquired.

Figure 5:
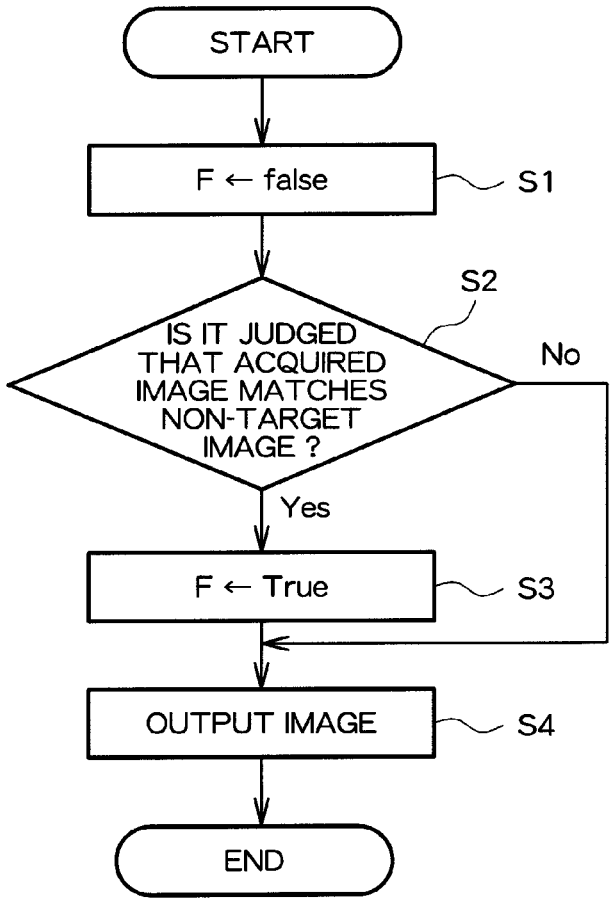
FIG. 5 is a flowchart showing an example of processing for judging whether an image can be recorded in the information recording device according to the first aspect of the exemplary embodiment of the present invention.

The recording permission determination unit 24 starts processing for determining whether an image can be recorded upon reception of an input of the acquired image. In this processing, as shown in FIG. 5, the recording permission determination unit 24 first initializes a recording exclusion variable F to "false" (S1). Then, the recording permission determination unit 24 compares the acquired image with the non-target image retained in the non-target image retention unit 22 (S2). Details of the process of S2 will be described later. Note that when plural non-target images are retained in the non-target image retention unit 22, the acquired image is compared with each of the plural non-target images.

Here, when at least a part of the acquired image matches the non-target image, the recording exclusion variable F is set to "true" (S3) and the image is output to the image recording unit 25 (S4). Further, in step S2, when it is not judged that at least a part of the acquired image matches the non-target image, the process proceeds to S4 with the recording exclusion variable F set to "false", and recording permission determination unit 24 outputs the images to the image recording unit 25.

For example, the comparison between the acquired image and the non-target image by the recording permission determination unit 24 is made as follows. Specifically, the recording permission determination unit 24 divides the acquired image and the non-target image to be a comparison target into N×M blocks, respectively. Then, the recording permission determination unit 24 judges whether a value of pixels in the block of the acquired image matches a value of pixels in the corresponding block of the non-target image to be the comparison target. In this case, the number of pixels whose pixel values match is counted, and when the ratio of the counted number of pixels to the number of pixels in the block exceeds the preset ratio, the images may be judged to match each other. Note that it may be judged as a match when the ratio is 100%, that is, when the images are in a complete match.

The recording permission determination unit 24 counts the number of blocks judged to be in a match among the N×M blocks. Then, the recording permission determination unit 24 computes the ratio by which the blocks judged to be in a match occupy the N×M blocks. After that, when the ratio obtained by the computation exceeds the preset threshold, at least a part of the acquired image is judged to be in a match with the non-target image.

In the case of the non-target image to be the comparison target is retained together with the coordinate information indicating the selected range, a part indicated by the coordinate information is extracted from the non-target image. In addition, a part indicated by the coordinate information is extracted from the acquired image. Then, the partial images acquired through the extraction are compared with one another. In the comparison, the images may be divided into plural blocks to determine for each block the match/mismatch of the images based on the number of pixels having the same value among pixel values contained in the block. Thus, it may be judged whether the partial images acquired through the extraction match one another based on the number of blocks judged to be in a match or the ratio thereof. In this case, it is judged that at least a part of the acquired image matches the non-target image when the partial images acquired through the extraction match one another.

Figure 6:
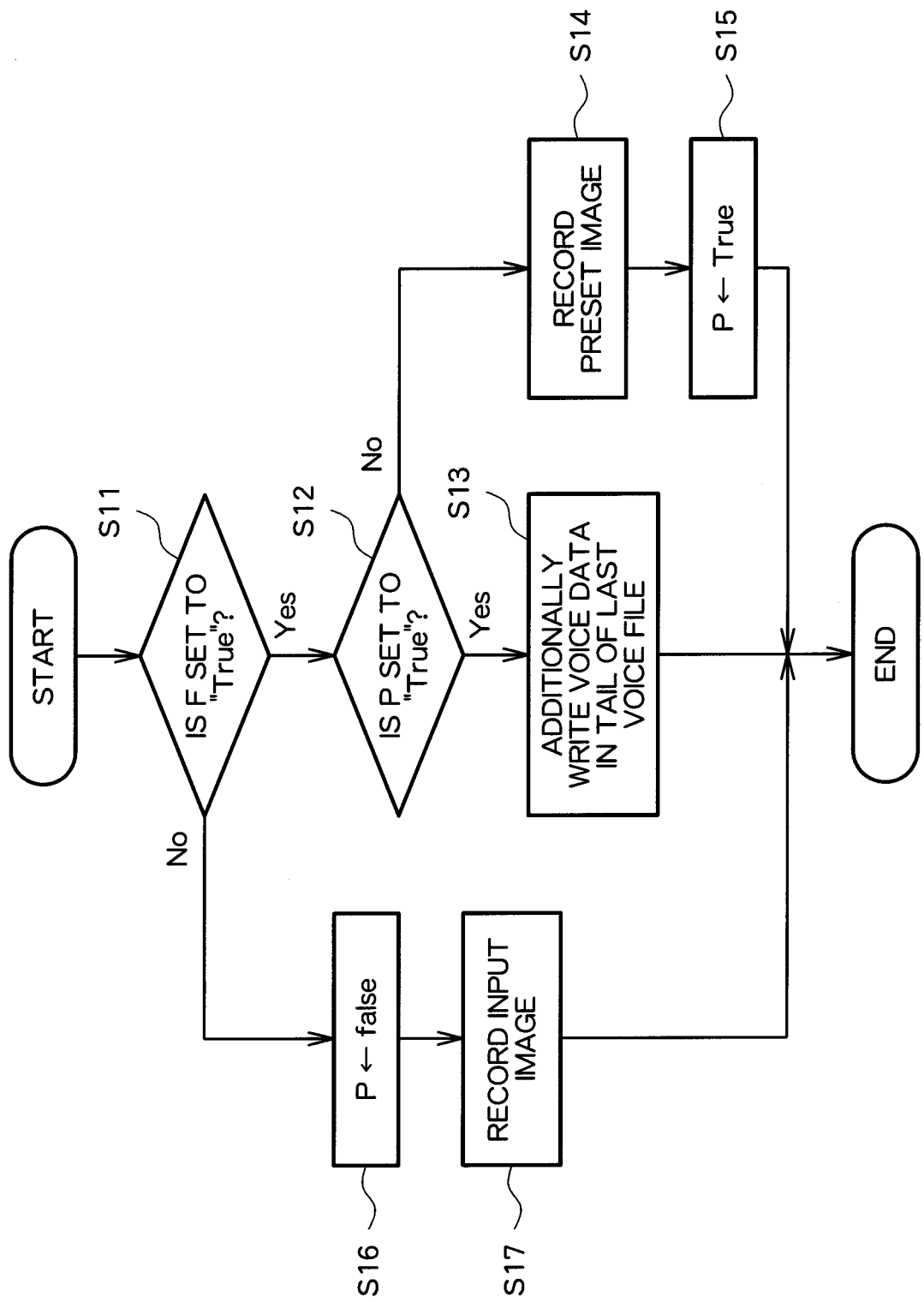
FIG. 6 is a flowchart showing an example of processing for recording an image and voice data in the information recording device according to the first aspect of the exemplary embodiment of the present invention.

The image recording unit 25 starts processing shown in FIG. 6 upon reception of an input of an image from the recording permission determination unit 24. Note that the image recording unit 25 initializes a last recording exclusion variable P to "false" prior to the start of the processing, such as when the information recording device 1 is connected to the personal computer 2. Upon start of the processing shown in FIG. 6, the image recording unit 25 refers to the recording exclusion variable F and judges whether the recording exclusion variable F is set to "true" (S11). When the recording exclusion variable F is set to "true", the image recording unit 25 further judges whether the last recording exclusion variable P is set to "true" (S12). Here, when the last recording exclusion variable P is set to "true", the image recording unit 25 instructs the voice recording unit 26 to additionally write voice data in a file recorded the last time (S13), and ends the processing.

On the other hand, when it is judged in the process of S12 that the last recording exclusion variable P is set to "false", a preset image (e.g., an image having a character string of "NOW WORKING" written in white on a black background) is recorded in the memory 22 instead of the input image (S14) and the last recording exclusion variable P is set to "true" (S15). Then, the processing is ended.

Further, when it is judged in the process of S11 that the recording exclusion variable F is set to "false", the last recording exclusion variable P is set to "false" (S16) and the image output from the recording permission determination unit 24 is recorded in the memory 12 (S17).

Note that each image is recorded together with information indicating a recorded order of the image. For example, each of the images may be recorded as an individual file with a file name in a consecutive number.

The voice recording unit 26 accumulates in the memory 12 the input voice as predetermined code data. Note that the data may be sectioned and retained as individual files every time a signal indicating that the image has been acquired is input. In this case, the recorded order of the voice data may be represented by including a consecutive number in the file name thereof, for example.

Further, upon reception of an instruction to additionally write the voice data in the last voice data from the image recording unit 25, the voice recording unit 26 additionally records the voice data at a tail of the file of the voice data generated last without generating a new file.

The information recording device 1 according to the first aspect having the above-mentioned structure is, for example, operated as follows. The following example is an example of a case where a series of operation including starting a presentation, temporarily suspending the presentation in the midst thereof for another task, resuming the presentation thereafter, and ending the presentation is carried out.

Figure 7A:
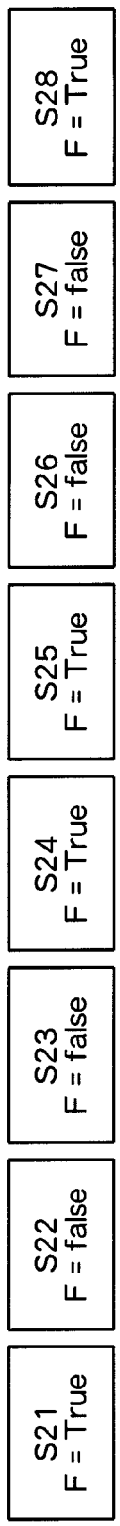
FIG. 7A is an explanatory diagram showing an example of an operation of the information recording device according to the first aspect of the exemplary embodiment of the present invention.

In this example, as shown in FIG. 7A, first, as preparation for starting the presentation, an image to be a background and other windows are displayed (S21). Upon start of the presentation, images of the slide show are displayed in a full-screen mode (S22 and S23). Upon start of some workings, the image as the background and the other windows may be displayed again (S24 and S25). After that, upon resuming the presentation, the images of the slide show are displayed in a full-screen mode (S26 and S27), and the background and the other windows are displayed when the presentation is finished (S28).

Thus, in the information recording device 1 according to the first aspect, the image to be the background is retained as the non-target image. Accordingly, in a state where the image as the background and the other windows are displayed, it is judged that the image matches the non-target image. In the above example, specifically, images of S21, S24, S25, and S28 are judged as the non-target image and an image containing a character string of "NOW WORKING" is recorded instead of the images judged as the non-target image.

Figure 7B:
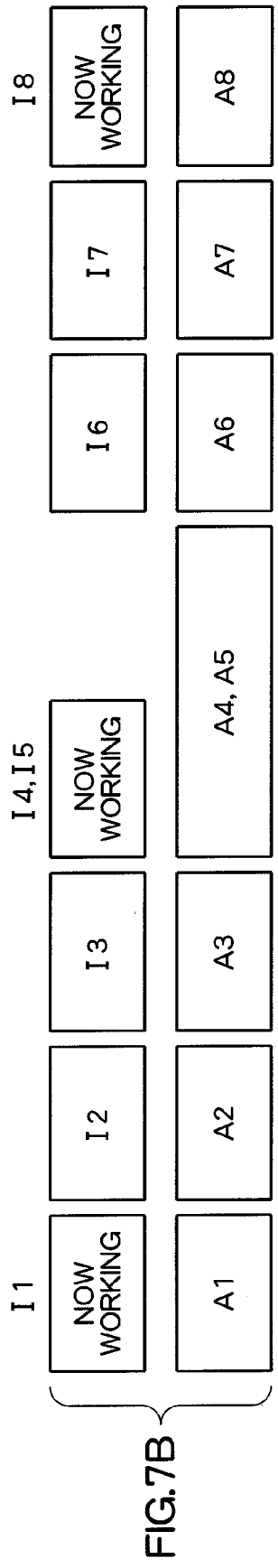
FIG. 7B is an explanatory diagram showing another example of an operation of the information recording device according to the first aspect of the exemplary embodiment of the present invention.

In addition, when recording the image of "NOW WORKING" in place of the image of S24, the last recording exclusion variable P is set to "true". Thus, voice data (A5) at the time of S25 is additionally written at the tail of the file of the voice data of S24 (see FIG. 7B).

Note that in the above description, the images recorded in place of the images judged to be in a match with the non-target images have been assumed to be of the same type. However, the present invention is not limited thereto and the image may be any of plural images set in advance or an image generated in accordance with a rule set in advance. For example, each of the non-target images may be retained in association with information expressing an image to be recorded as a replacement (information for specifying the image itself or a rule for generating the image). Subsequently, when it is judged that the acquired image matches any one of the non-target images, the information recording device 1 generates or reads out an image to be recorded as a replacement based on the information associated with the non-target image judged to be in a match, and records the image to be recorded as a replacement in place of the acquired image.

In such case, for example, when the window of the presentation software is displayed, an image containing characters of "NOW WORKING" may be recorded as a replacement, and when the background image is displayed, an image containing characters of "TALKING" may be recorded as a replacement.

Further, upon reception of the input of an image from the recording permission determination unit 24, the image recording unit 25 may execute next processing shown in FIG. 8 instead of the processing shown in FIG. 6. In this example, the image recording unit 25 refers to the recording exclusion variable F to judge whether the variable F is set to "true" (S31). Then, when the recording exclusion variable F is set to "true", the image recording unit 25 refers to the memory 12 to check whether there is a voice file that has been recorded last time (S32). When there is no voice file that has been recorded last time (i.e., there is voice data obtained immediately after the start of the recording), the image recording unit 25 instructs the voice recording unit 26 to additionally write the voice data in a head portion of a file to be recorded next time (S33), and ends the processing.

On the other hand, when there is a voice file that has been recorded last time in the process of S32, the image recording unit 25 instructs the voice recording unit 26 to additionally write the voice data in a tail portion of the file that has been recorded the last time (S34), and ends the processing.

In addition, when the recording exclusion variable F is set to "false" in the process of S31, the image recording unit 25 records the image output from the recording permission determination unit 24 in the memory 12 (S35).

In this case, when the instruction is given to additionally write the data at the head of the voice file to be recorded next time, the voice recording unit 26 temporarily retains the input voice data, generates a voice file, and adds the retained voice data at the head portion of the voice file thereafter, thereby updating the voice file.

Figure 7C:
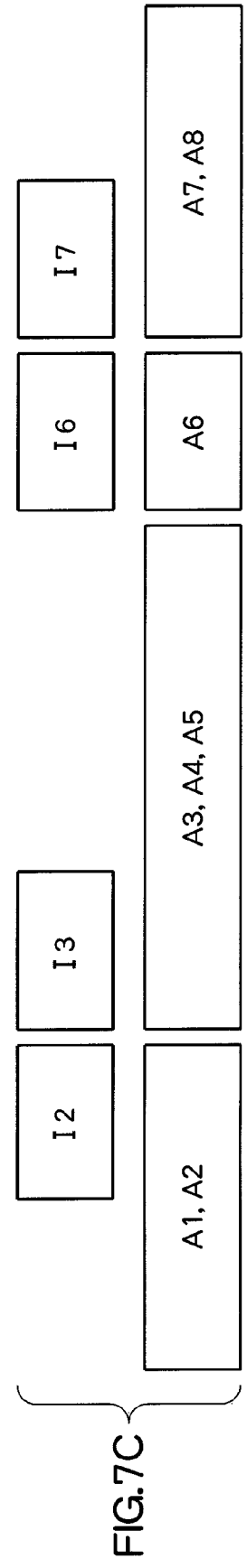
FIG. 7C is an explanatory diagram showing still another example of an operation of the information recording device according to the first aspect of the exemplary embodiment of the present invention.

According to this example, when a display is made based on the example shown in FIG. 7A, the content thereof is as shown in FIG. 7C. In other words, an image corresponding to S21 at the head is not recorded and the voice data A1 in this case is recorded together with the subsequent voice data A2 in one file. Further, items of voice data A4, A5, A8, and the like having no corresponding images are additionally written to the preceding voice file recorded.

In the information recording device 1 according to the first mode, when the plural items of voice data are contained in a single voice file as described above, the name of the file may be set such that consecutive numbers indicating a reproduction order of the pieces of voice data are coupled in order like "A1A2".

Images and voice data thus recorded are reproduced in the following manner according to the consecutive numbers in the file name. Specifically, a file of an image and voice containing a consecutive number "1" is retrieved. Then, the retrieved file is reproduced. According to the example shown in FIG. 7B, an image I1 (image of "NOW WORKING") and a voice contained in voice A1 are reproduced. Upon completion of the reproduction of both items of data, a file of an image and voice containing a consecutive number "2" is retrieved. Then, the retrieved file is reproduced. The processing is repeated hereinafter.

Similarly, according to the example shown in FIG. 7C, a voice file having the name "A1A2" containing the voice A1 is reproduced. In the case of an image, because the image I1 does not exist, an image I2 corresponding to a voice A2 is reproduced.

Heretofore, the information recording device 1 according to the first aspect has been described as a device separate from the personal computer 2. However, the information recording device 1 and the personal computer 2 may have an integrated structure. In this case, a processor of the personal computer 2 may serve as the controller 11. Further, a memory or a hard disk of the personal computer 2 may serve as the memory 12 for storing the program.

In addition, the information recording device 1 may be integrally structured with a device that projects video signals upon input of the video signals from the personal computer 2 and the like, such as a projector (projecting device).

Next, an information providing device according to a second aspect of the exemplary embodiment of the present invention will be described. As exemplified in FIG. 9, an information providing device 3 according to the second aspect is composed of the controller 11, the memory 12, the interface (I/F) 13, and a communication unit 14. In addition, the information providing device 3 is connected to the personal computer 2 and the like. Note that the same components as those of the information recording device according to the first aspect are denoted by the same reference numerals and details of descriptions thereof will be omitted. A description is given only of different operations.

In the information providing device 3 according to the second aspect, an operation of the controller 11 is slightly different from that of the information recording device according to the first aspect. The controller 11 in this case acquires images and voices output from the personal computer 2. Then, the controller 11 judges whether the acquired image is a preset non-target image to determine whether the acquired image is an image to be provided. Based on the determination, the controller 11 distributes the image determined as the image to be provided together with the voice data via the communication unit 14. The operation of the controller 11 according to the second aspect will be described later in detail.

The communication unit 14 is, for example, a network interface, and distributes and provides information of images and voice to an external client device via communication devices such as a network.

Figure 10:
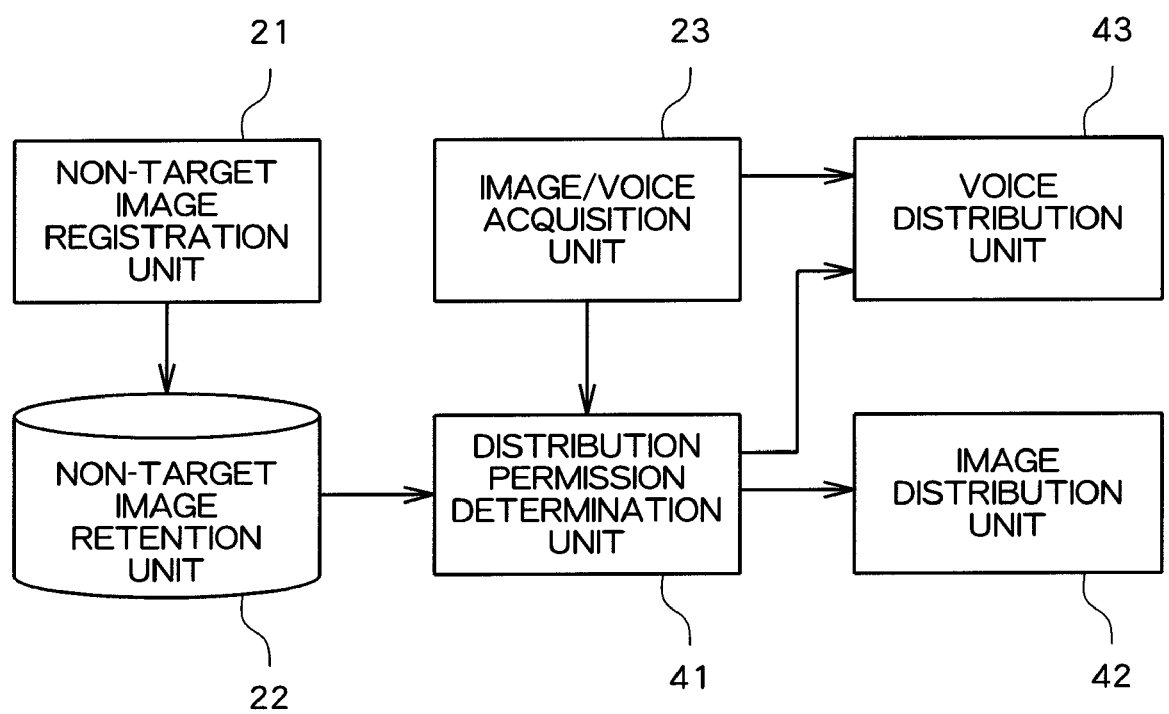
FIG. 10 is a functional block diagram showing an example of the information providing device according to the second aspect of the exemplary embodiment of the present invention.

The information providing device 3 according to the second aspect is realized by the controller 11 executing software processing. In addition, as shown in FIG. 10, the information providing device 3 according to the second aspect is functionally composed of a non-target image registration unit 21, a non-target image retention unit 22, an image/voice acquisition unit 23, a distribution permission determination unit 41, an image distribution unit 42, and a voice distribution unit 43.

Figure 11:
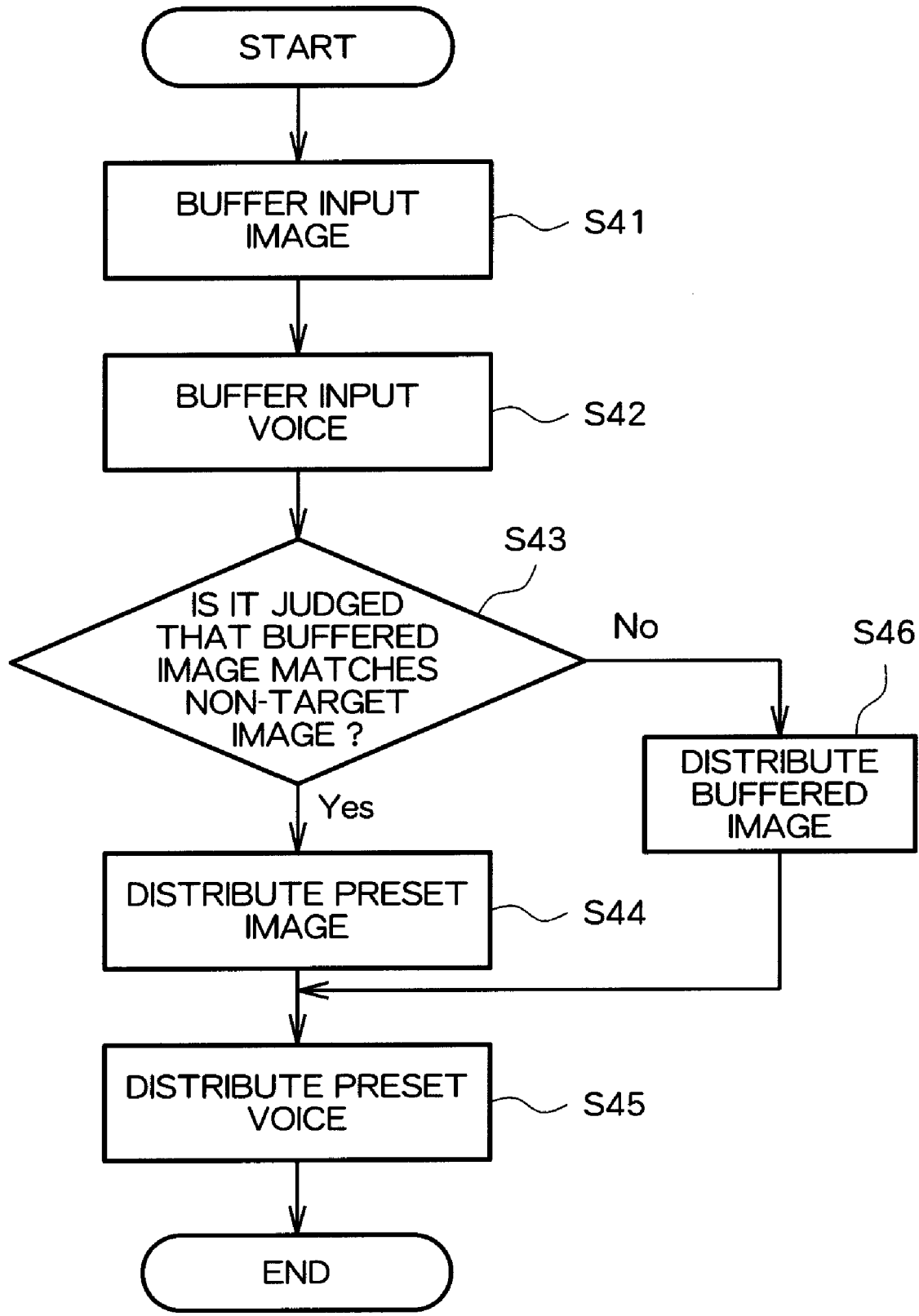
FIG. 11 is a flowchart showing an example of an operation of the information providing device according to the second aspect of the exemplary embodiment of the present invention.

As shown in FIG. 11, upon reception of an input of an acquired image, the distribution permission determination unit 41 temporarily stores (buffers) the image (S41). Further, the distribution permission determination unit 41 instructs the voice distribution unit 43 to also temporarily retain (buffer) a voice input while the image is provided as voice data (S42). Then, the distribution permission determination unit 41 compares the temporarily stored image and the non-target image retained in the non-target image retention unit 22 (S43). Details of the process of S43 is the same as that of the process in comparison in the information recording device 1 according to the first aspect. Thus, a detailed description thereof will be omitted. Note that when plural non-target images are retained in the non-target image retention unit 22, the acquired image is compared with each of the non-target images.

Subsequently, when it is judged that the temporarily stored image matches the non-target image retained in the non-target image retention unit 22, the distribution permission determination unit 41 distributes a preset image (e.g., image containing the character string of "operating task") (S44) and instructs the voice distribution unit 43 to start distributing the temporarily retained voice data (S45).

Further, when it is judged in the process of S43 that the temporarily stored image does not match the non-target image retained in the non-target image retention unit 22, the distribution permission determination unit 41 starts distributing the temporarily retained image (S46) and further proceeds to the process of S45 to instruct the voice distribution unit 43 to start distributing the temporarily retained voice data.

Upon start of the image distribution, the image distribution unit 42 distributes the temporarily retained image in a predetermined format, via the communication unit 14.

Upon reception of an instruction to temporarily retain the input voice data, the voice distribution unit 43 accumulates and retains the input voice data in the memory 12 or the like. Further, upon reception of an instruction to distribute the voice data, the voice distribution unit 43 distributes the items of retained voice data as voice data in a predetermined format, and in the retained order, via the communication unit 14.

Note that here, voice distribution is also controlled such that the voice is distributed after the corresponding image to be displayed is distributed. However, the voice may be stream-distributed as it is at a point in time when the voice is input.

Further, a description has been given of an example of the case of distributing an image. However, for example, the image may be displayed or projected instead of being distributed. In this case, the communication unit 14 is not always necessary.

Further, also in the information providing device according to the second aspect, the image to be recorded in place of the image judged to be in a match with the non-target image may be any of the plural images set in advance or an image generated in accordance with a rule set in advance. For example, also in this case, each of the non-target images is retained in association with information expressing the image to be recorded as a replacement (information for specifying the image itself or a rule for generating the image). Subsequently, when it is judged that the acquired image matches any of the non-target images, the information providing device 3 generates or reads out the image to be recorded as a replacement based on the information associated with the non-target image judged to be in a match, and provides the image to be recorded as a replacement in place of the acquired image.

Figure 12:
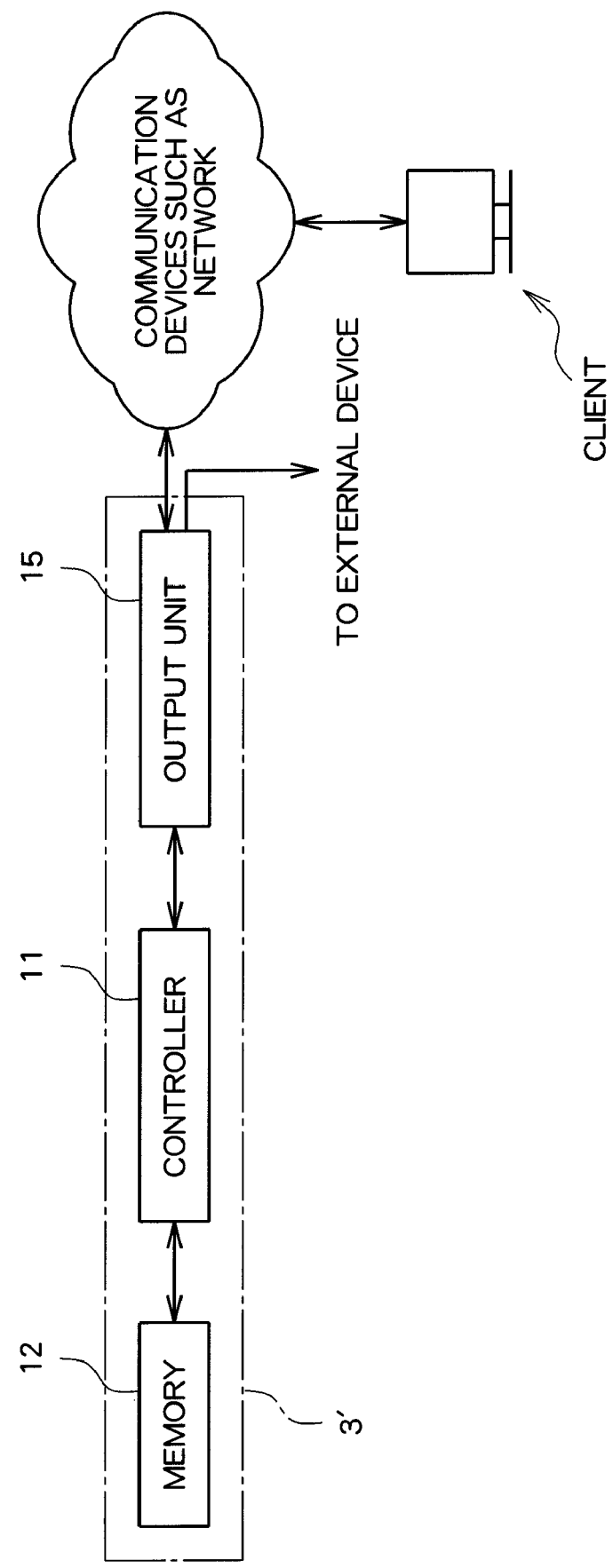
FIG. 12 is a structural block diagram of an information providing device according to a third aspect of the exemplary embodiment of the present invention.

Further, as shown in FIG. 12, an information providing device 3' according to a third aspect of the exemplary embodiment of the present invention is composed of the controller 11, the memory 12, and an output unit 15. Note that the same components as those of the information providing device according to the second aspect are denoted by the same reference numerals, and descriptions thereof will be omitted. A description is given only of different operations.

In the information providing device 3' according to the third aspect, the operation of the controller 11 is slightly different from that of the information providing device according to the second aspect. Specifically, the controller 11 in the information providing device 3' according to the third aspect also provides a function as the personal computer 2 that has been connected to the information providing device 3 according to the second aspect.

In other words, the controller 11 in the information providing device 3' according to the third aspect outputs images and voices in accordance with an instruction from a user. Further, the controller 11 judges whether the output image is a preset non-target image to determine whether the output image is an image to be provided. The controller 11 outputs, based on the determination, the image determined as the image to be provided together with the voice to the external device, via the output unit 15.

Here, the output unit 15 may be, for example, a video terminal, a voice terminal, or a display. Further, the output unit 15 may be communication devices such as the network interface. In the case of the network interface or the like, information of images and voices are transmitted to an opposite side.

Figure 13:
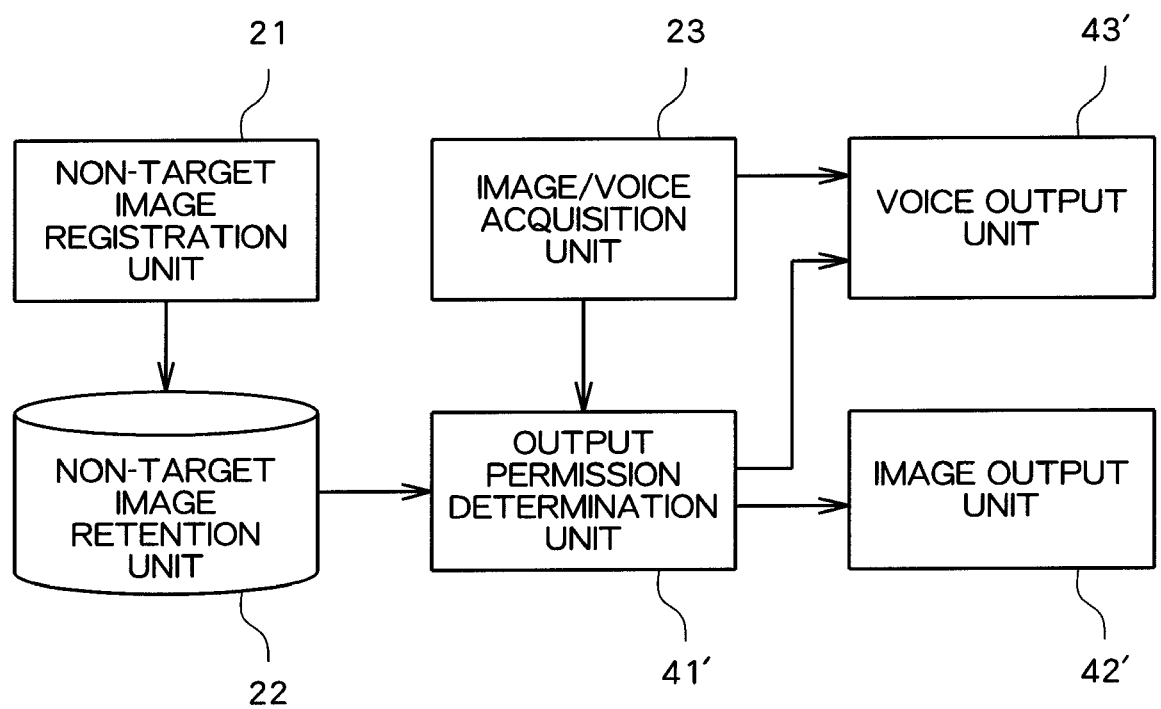
FIG. 13 is a functional block diagram showing an example of the information providing device according to the third aspect of the exemplary embodiment of the present invention.

As shown in FIG. 13, the information providing device 3' according to the third aspect is functionally composed of the non-target image registration unit 21, the non-target image retention unit 22, the image/voice acquisition unit 23, an output permission determination unit 41', an image output unit 42', and a voice output unit 43'.

The output permission determination unit 41' temporarily stores (buffers) an image as an output target. Further, the output permission determination unit 41' also instructs the voice output unit 43' to temporarily retain (buffer) a voice input while the image is provided.

The output permission determination unit 41' compares the temporarily stored image and the non-target image retained in the non-target image retention unit 22. A details of the processing is the same as that of the comparison processing in the information recording device 1 according to the first aspect. Thus, a detailed description thereof will be omitted. Note that when plural non-target images are retained in the non-target image retention unit 22, the temporarily stored image is compared with each of the non-target images.

When it is judged that the temporarily stored image to be the output target matches the non-target image retained in the non-target image retention unit 22, the output permission determination unit 41' outputs a preset image (e.g., image containing the character string of "NOW WORKING") and instructs the voice output unit 43' to start outputting the temporarily retained voice.

In addition, when it is judged that the temporarily stored image to be the output target does not match the non-target image retained in the non-target image retention unit 22, the output permission determination unit 41' outputs the temporarily retained image, and further instructs the voice output unit 43' to start outputting the temporarily retained voice.

Upon reception of the instruction to output the image, the image output unit 42' outputs via the output unit 15 the temporarily retained image in a predetermined format.

Upon reception of the instruction to temporarily retain the input voice data, the voice output unit 43' accumulates and retains the input voice data in the memory 12 or the like. In addition, upon reception of the instruction to output the voice data, the voice output unit 43' outputs via the output unit 15 items of the retained voice data in a predetermined format in the retained order.

Further, also in the information providing device according to the third aspect, the image to be recorded in place of the image judged to be in a match with the non-target image may be any of the plural images set in advance or an image generated in accordance with a rule set in advance. For example, also in this case, each of the non-target images is retained in association with information expressing the image to be recorded as a replacement (information for specifying the image itself or a rule for generating the image). Subsequently, when it is judged that at least part of the acquired image matches any of the non-target images, the information providing device 3' generates or reads out the image to be recorded as a replacement based on the information associated with the non-target image judged to be in a match, and provides the image to be recorded as a replacement in place of the acquired image.

Further, in the information providing device according to the third mode, images and voices are retained in the memory 12. However, the images and voices may be retained in an external memory device (not shown) instead of the memory 12.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information outputting device, comprising:
a reception unit that receives a first image which is a target of output;
a judgment unit that judges whether at least a part of the first image is a preset image; and
an output unit that outputs the first image when it is judged that at least a part of the first image is not the preset image based on a result of the judgment made by the judgment unit; wherein
the output unit continues outputting a second image that has been output previously when it is judged that at least a part of the first image is the preset image based on the result of the judgment made by the judgment unit.

2. The information outputting device according to claim 1, wherein the judgment unit judges whether at least a part of the first image is a preset image when the first image is received.

3. The information outputting device according to claim 1, wherein when it is judged that at least a part of the first image is the preset image based on the result of the judgment made by the judgment unit, the output unit controls not to output the first image.

4. The information outputting device according to claim 1, wherein the judgment unit performs the judgment by dividing each of the first image and the preset image into a plurality of blocks and determines whether at least the part of the first image is the preset image on a block by block basis.

5. The information outputting device according to claim 1, wherein the judgment unit performs the judgment by dividing each of the first image and the preset image into a plurality of blocks and determines whether at least the part of the first image is the preset image on a block by block basis, and
the judgment unit judges whether a value of pixels in each block of the first image matches a value of pixels in a corresponding block of the preset image in order to determine whether at least a part of the first image is the preset image.

6. An information outputting device comprising:
a reception unit that receives a first image which is a target of output;
a judgment unit that judges whether at least a part of the first image is a preset image; and
an output unit that outputs the first image when it is judged that at least a part of the first image is not the preset image based on a result of the judgment made by the judgment unit
wherein the output unit outputs an alternative image when it is judged that at least a part of the first image is the preset image based on the result of the judgment made by the judgment unit.

7. The information outputting device according to claim 6, wherein the judgment unit judges whether at least a part of the first image is the preset image when the first image is received.

8. The information outputting device according to claim 6, wherein when it is judged that at least a part of the first image is the preset image based on the result of the judgment made by the judgment unit, the output unit controls not to output the first image.

9. The information outputting device according to claim 6, wherein the judgment unit performs the judgment by dividing each of the first image and the preset image into a plurality of blocks and determines whether at least the part of the first image is the preset image on a block by block basis.

10. The information outputting device according to claim 6, wherein the judgment unit performs the judgment by dividing each of the first image and the preset image into a plurality of blocks and determines whether at least the part of the first image is the preset image on a block by block basis, and
the judgment unit judges whether a value of pixels in each block of the first image matches a value of pixels in a corresponding block of the preset image in order to determine whether at least a part of the first image is the preset image.

11. An information outputting method, comprising:
receiving a first image which is a target of output;
judging, using at least one computer, whether at least a part of the first image is a preset image; and
outputting the first image when it is judged that at least a part of the first image is not the preset image based on a result of the judgment and continuing to output a second image that has been output previously when it is judged that at least a part of the first image is the preset image based on the result of the judgment.

12. A computer readable recording medium recording thereon a program that causes a computer to execute a process comprising:
receiving a first image which is a target of outputting;
judging whether at least a part of the first image is a preset image; and
outputting the first image when it is judged that at least a part of the first image is not the preset image based on a result of the judgment and continues to output a second image that has been output previously when it is judged that at least a part of the first image is the preset image based on the result of the judgment.

13. An image projecting system, comprising:
an output device that outputs a first image designated by a user as a target of projecting;
and a projector that receives the first image output by the output device, judges whether at least a part of the first image is a preset image, and projects the first image when it is judged that at least a part of the first image is not the preset image based on a result of the judgment;

wherein the projector continues outputting a second image that has been output previously when it is judged that at least a part of the first image is the preset image based on the result of the judgment.

14. The information projecting system according to claim 13, further comprising:
a recording device that records the first image when it is judged that at least a part of the first image is not the preset image based on a result of the judgment.

15. An image projecting system, comprising:
an output device that outputs a first image designated by a user as a target of projecting;
and a projector that receives the first image output by the output device, judges whether at least a part of the first image is a preset image, and projects the first image when it is judged that at least a part of the first image is not the preset image based on a result of the judgment;
wherein the projector outputs an alternative image when it is judged that at least a part of the first image is the preset image based on the result of the judgment.

16. The information projecting system according to claim 15, further comprising:
a recording device that records the first image when it is judged that at least a part of the first image is not the preset image based on a result of the judgment.

17. An information outputting method, comprising:
receiving a first image which is a target of output;
judging, using at least one computer, whether at least a part of the first image is a preset image; and
outputting the first image when it is judged that at least a part of the first image is not the preset image based on a result of the judgment, and outputting an alternative image when it is judged that at least a part of the first image is the preset image based on the result of the judgment.

18. A computer readable recording medium recording thereon a program that causes a computer to execute a process comprising:
receiving a first image which is a target of outputting;
judging whether at least a part of the first image is a preset image; and
outputting the first image when it is judged that at least a part of the first image is not the preset image based on a result of the judgment, and outputting an alternative image when it is judged that at least a part of the first image is the preset image based on the result of the judgment.

* * * * *